US012766917B2

(12) United States Patent
Kato

(10) Patent No.: US 12,766,917 B2
(45) Date of Patent: Oct. 20, 2026

(54) VEHICLE AIR CONDITIONING CONTROL SYSTEM

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 332 days.

(21) Appl. No.: 18/582,135

(22) Filed: Feb. 20, 2024

(65) Prior Publication Data

US 2024/0300288 A1 Sep. 12, 2024

(30) Foreign Application Priority Data

Mar. 8, 2023 (JP) ................................ 2023-036073

(51) Int. Cl.
*B60H 1/00* (2006.01)

(52) U.S. Cl.
CPC ................................ *B60H 1/00742* (2013.01)

(58) Field of Classification Search
CPC ............ B60H 1/00742; B60H 1/00657; B60H 1/00735
See application file for complete search history.

(56) References Cited

U.S. PATENT DOCUMENTS

2018/0251122 A1* 9/2018 Golston ................ B60W 40/08
2020/0135190 A1* 4/2020 Kaja ....................... G10L 15/22
2020/0269809 A1* 8/2020 Sanji ....................... B60R 25/31
2023/0202490 A1* 6/2023 Marzorati ......... B60W 50/0098 701/36
2023/0286464 A1 9/2023 Asai et al.

FOREIGN PATENT DOCUMENTS

JP 2022-084358 A 6/2022

* cited by examiner

*Primary Examiner* — Aleksey Olshannikov
(74) *Attorney, Agent, or Firm* — Rimon P.C.

(57) ABSTRACT

A vehicle air conditioning control system includes one or more mobile terminals and a vehicle air conditioning control apparatus. The one or more mobile terminals each includes a preference data acquisition unit that acquires preference data regarding an air conditioning setting for a corresponding one of the one or more occupants. The vehicle air conditioning control apparatus includes a terminal position detection unit, a seated position detection unit, an identification unit, a data acquisition unit, and a control unit. The identification unit identifies the one or more mobile terminals as being respectively associated with one or more seated positions. The control unit controls air conditioning settings for respective ones of the one or more seated positions, based on the one or more seated positions and the preference data acquired from the one or more mobile terminals respectively associated with the one or more seated positions.

5 Claims, 11 Drawing Sheets

FIG. 3
SETTING TEMPERATURE
22 °C
SETTING AIR VOLUME
I DON' T MIND STRONG AIR
I DO MIND STRONG AIR
WIND DIRECTION
I DON' T MIND THE WIND BLOWING ON MY FACE
I DO MIND THE WIND BLOWING ON MY FACE
DRY
I LIKE DRY
I DON' T LIKE DRY
HUMIDITY
I LIKE HUMIDITY
I DON' T LIKE HUMIDITY
ARE YOU SENSITIVE TO HEAT?
YES
NO
ARE YOU SENSITIVE TO COLD?
YES
NO

| SEATED POSITION | MOBILE TERMINAL | SETTING TEMPERATURE IN PREFERENCE DATA | TEMPERATURE DIFFERENCE | AVERAGE TEMPERATURE | SETTING TEMPERATURE AFTER CHANGE | TEMPERATURE DIFFERENCE AFTER CHANGE |
|---|---|---|---|---|---|---|
| DRIVER'S SEAT | MOBILE TERMINAL 100_1 | 26°C | 6°C | 23°C | 25°C | 4°C |
| PASSENGER SEAT | MOBILE TERMINAL 100_2 | 20°C | | | 21°C | |

FIG. 7

| SEATED POSITION | MOBILE TERMINAL | SETTING TEMPERATURE IN PREFERENCE DATA | AVERAGE TEMPERATURE | SETTING TEMPERATURE |
|---|---|---|---|---|
| DRIVER'S SEAT | MOBILE TERMINAL 100_1 | 24°C | 23°C | 24°C |
| PASSENGER SEAT | MOBILE TERMINAL 100_2 | 22°C | | 22°C |
| REAR SEAT 1 | — | — | — | 23°C |

FIG. 8

VEHICLE AIR CONDITIONING CONTROL SYSTEM

CROSS-REFERENCE TO RELATED APPLICATIONS

The present application claims priority from Japanese Patent Application No. 2023-036073 filed on Mar. 8, 2023, the entire contents of which are hereby incorporated by reference.

BACKGROUND

The disclosure relates to a vehicle air conditioning control system.

In recent years, vehicles have been put into practice that identify occupants of the vehicle, and make an air conditioning control for each seat based on air conditioning settings registered by each of the occupants, to provide a comfortable cabin space.

For example, this kind of techniques includes a proposal for a vehicle that identifies who is seated on each seat based on a position of a mobile terminal carried by an occupant of the vehicle and makes an air conditioning control for each seat based on air conditioning settings for each occupant. The air conditioning setting for each occupant is held in an air conditioning control apparatus. For example, reference is made to Japanese Unexamined Patent Application Publication (JP-A) No. 2022-084358.

SUMMARY

An aspect of the disclosure provides a vehicle air conditioning control system. The vehicle air conditioning control system includes one or more mobile terminals and a vehicle air conditioning control apparatus. The one or more mobile terminals are respectively carried by one or more occupants of a vehicle. The vehicle air conditioning control apparatus is configured to communicate with the one or more mobile terminals. The one or more mobile terminals each include a preference data acquisition unit. The preference data acquisition unit is configured to acquire preference data regarding an air conditioning setting for a corresponding one of the one or more occupants, and allow a storage to hold the preference data. The vehicle air conditioning control apparatus includes a terminal position detection unit, a seated position detection unit, an identification unit, a data acquisition unit, and a control unit. The terminal position detection unit is configured to detect positions of the one or more mobile terminals. The seated position detection unit is configured to detect one or more seated positions respectively occupied by the one or more occupants. The identification unit is configured to identify the one or more mobile terminals as being respectively associated with the one or more seated positions, based on the positions of the one or more mobile terminals and the one or more seated positions. The data acquisition unit is configured to acquire the preference data from the one or more mobile terminals. The control unit is configured to control the air conditioning setting for each of the one or more seated positions, based on the one or more seated positions and the preference data acquired from the one or more mobile terminals respectively associated with the one or more seated positions.

An aspect of the disclosure provides a vehicle air conditioning control system. The vehicle air conditioning control system includes one or more mobile terminals and a vehicle air conditioning control apparatus. The one or more mobile terminals are respectively carried by one or more occupants of a vehicle. The vehicle air conditioning control apparatus is configured to communicate with the one or more mobile terminals. The one or more mobile terminals each include one or more first processors. The one or more first processors are configured to acquire preference data regarding an air conditioning setting for a corresponding one of the one or more occupants, and allow a storage to hold the preference data. The vehicle air conditioning control apparatus includes: one or more second processors; and one or more memories communicably coupled to the one or more second processors. The one or more second processors are configured to: detect positions of the one or more mobile terminals; detect one or more seated positions respectively occupied by the one or more occupants; identify the one or more mobile terminals as being respectively associated with the one or more seated positions, based on the positions of the one or more mobile terminals and the one or more seated positions; acquire the preference data from the one or more mobile terminals; and control the air conditioning setting for each of the one or more seated positions, based on the one or more seated positions and the preference data acquired from the one or more mobile terminals respectively associated with the one or more seated positions.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 7 is a table of an example of a temperature setting method by the vehicle air conditioning control apparatus according to the embodiment of the disclosure.

FIG. 8 is a table of an example of the temperature setting method by the vehicle air conditioning control apparatus according to the embodiment of the disclosure.

DETAILED DESCRIPTION

Figure 1:
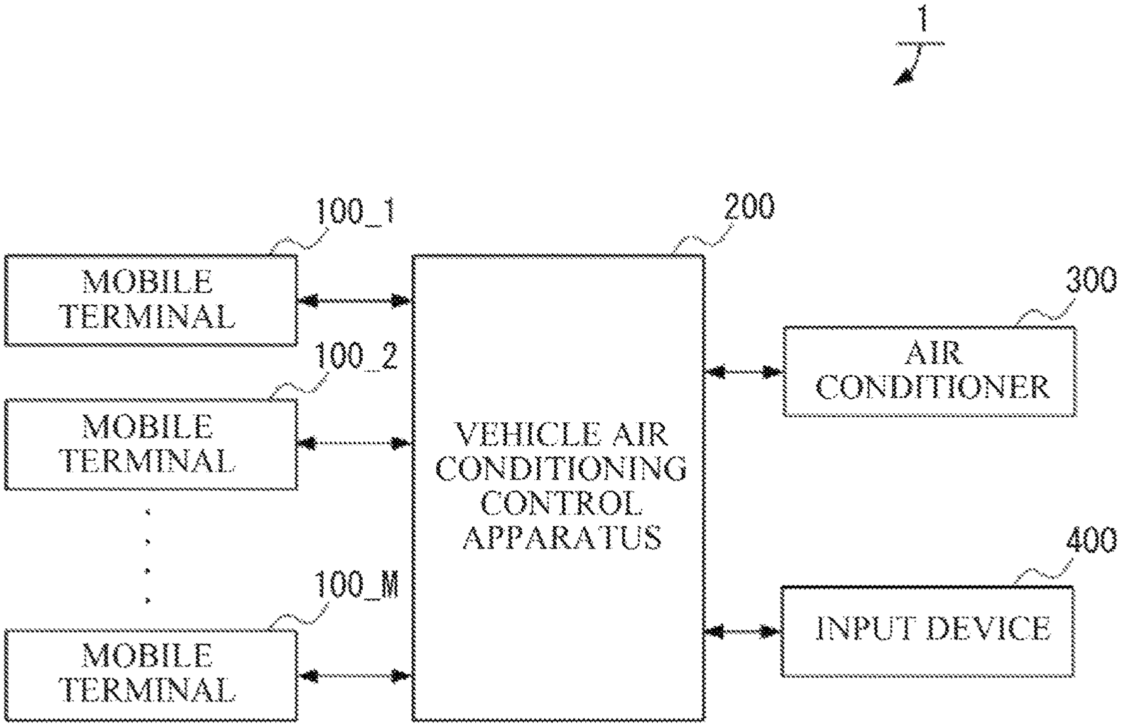
FIG. 1 is a block diagram of a configuration of a vehicle air conditioning control system according to an embodiment of the disclosure.

In the technique described in JP-A No. 2022-084358, data regarding the air conditioning settings for each occupant is held by the air conditioning control apparatus mounted on a specific vehicle. Thus, only limited vehicles enjoy an air conditioning control that reflects preference of an occupant.

It is desirable to provide a vehicle air conditioning control system that makes it possible to make an air conditioning control that reflects preference of each occupant without limitation as to vehicles.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

With reference to FIGS. 1 to 14, description is given of a vehicle air conditioning control system according to the example embodiments of the disclosure.

First Embodiment

With reference to FIGS. 1 to 10, description is given of a vehicle air conditioning control system 1 according to a first embodiment of the disclosure.

<Configuration of Vehicle Air Conditioning Control System 1>

As illustrated in FIG. 1, the vehicle air conditioning control system 1 of this embodiment may include, for example, mobile terminals 100_1 to 100_M, a vehicle air conditioning control apparatus 200, an air conditioner 300, and an input device 400.

In the following, the mobile terminals 100_1 to 100_M are generally referred to as "mobile terminals 100".

The mobile terminals 100 may each include, for example, a smartphone, or a mobile terminal carried by an occupant of a vehicle.

In this embodiment, for example, the mobile terminals 100 may be coupled to the vehicle air conditioning control apparatus 200 described later, to transmit and receive data regarding air conditioning settings that reflect preference of occupants carrying the mobile terminals 100.

Details of the mobile terminals 100 are described later.

The vehicle air conditioning control apparatus 200 may determine air conditioning settings for each seat of the vehicle, e.g., a temperature, an air volume, and a wind direction. The vehicle air conditioning control apparatus 200 may transmit the air conditioning settings thus determined to the air conditioner 300 described later.

Details of the vehicle air conditioning control apparatus 200 are described later.

The air conditioner 300 may control, for example, a blower fan, a heater, a compressor, and a wind direction changing mechanism, based on the air conditioning settings for each seat received from the vehicle air conditioning control apparatus 200, and perform air blowing.

The input device 400 may be, for example, a device including a switch, etc. to be operated by an occupant when the occupant changes the air conditioning settings. The input device 400 may acquire data regarding, for example, a temperature, an air volume, and a wind direction set by the occupant, and transmit the acquired data to the vehicle air conditioning control apparatus 200.

<Configuration of Mobile Terminal 100>

Figure 2:
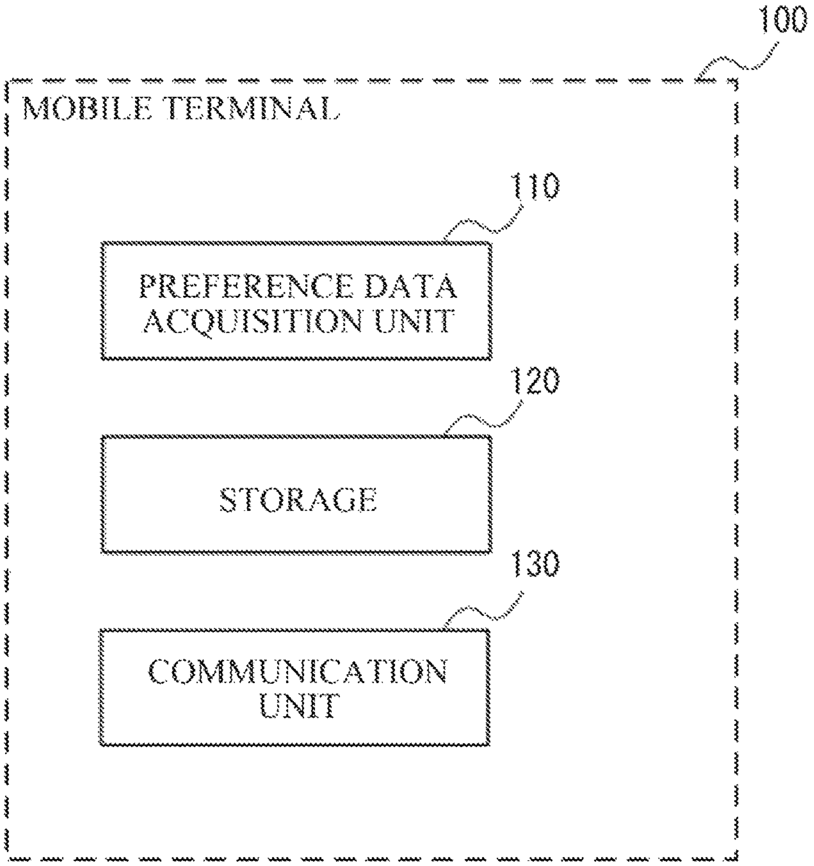
FIG. 2 is a block diagram of a configuration of a mobile terminal included in the vehicle air conditioning control system according to the embodiment of the disclosure.

As illustrated in FIG. 2, the mobile terminal 100 may include, for example, a preference data acquisition unit 110, a storage 120, and a communication unit 130.

The preference data acquisition unit 110 may acquire preference data regarding the air conditioning settings for the occupant, and allow the storage 120 to hold the acquired preference data.

The preference data acquisition unit 110 may acquire, for example, the preference data regarding the air conditioning settings such as a temperature setting value, preference for an air volume, preference for dry and humidity, and sensitivity to heat and cold, without limitation. Hereinafter, the preference data regarding the air conditioning setting is referred to as the "preference data".

Figure 3:
FIG. 3 is a diagram illustrating a display example for acquisition of preference data to be displayed on the mobile terminal included in the vehicle air conditioning control system according to the embodiment of the disclosure.

As illustrated in FIG. 3, the preference data acquisition unit 110 may display a questionnaire for acquisition of the preference data on an unillustrated display unit. The preference data acquisition unit 110 may acquire data regarding the temperature setting value for air conditioning inputted by the occupant, and data regarding preference as to each item of the air conditioning settings selected by the occupant, and store the acquired data in the storage 120.

The storage 120 may be a ROM or a RAM that is built in the mobile terminal 100, a detachable storage medium, or both.

The communication unit 130 may be coupled to the vehicle air conditioning control apparatus 200 by using, for example, Bluetooth (registered trademark) communication, and serve as an interface for transmission and receipt of the preference data regarding the air conditioning settings.

<Configuration of Vehicle Air Conditioning Control Apparatus 200>

Figure 4:
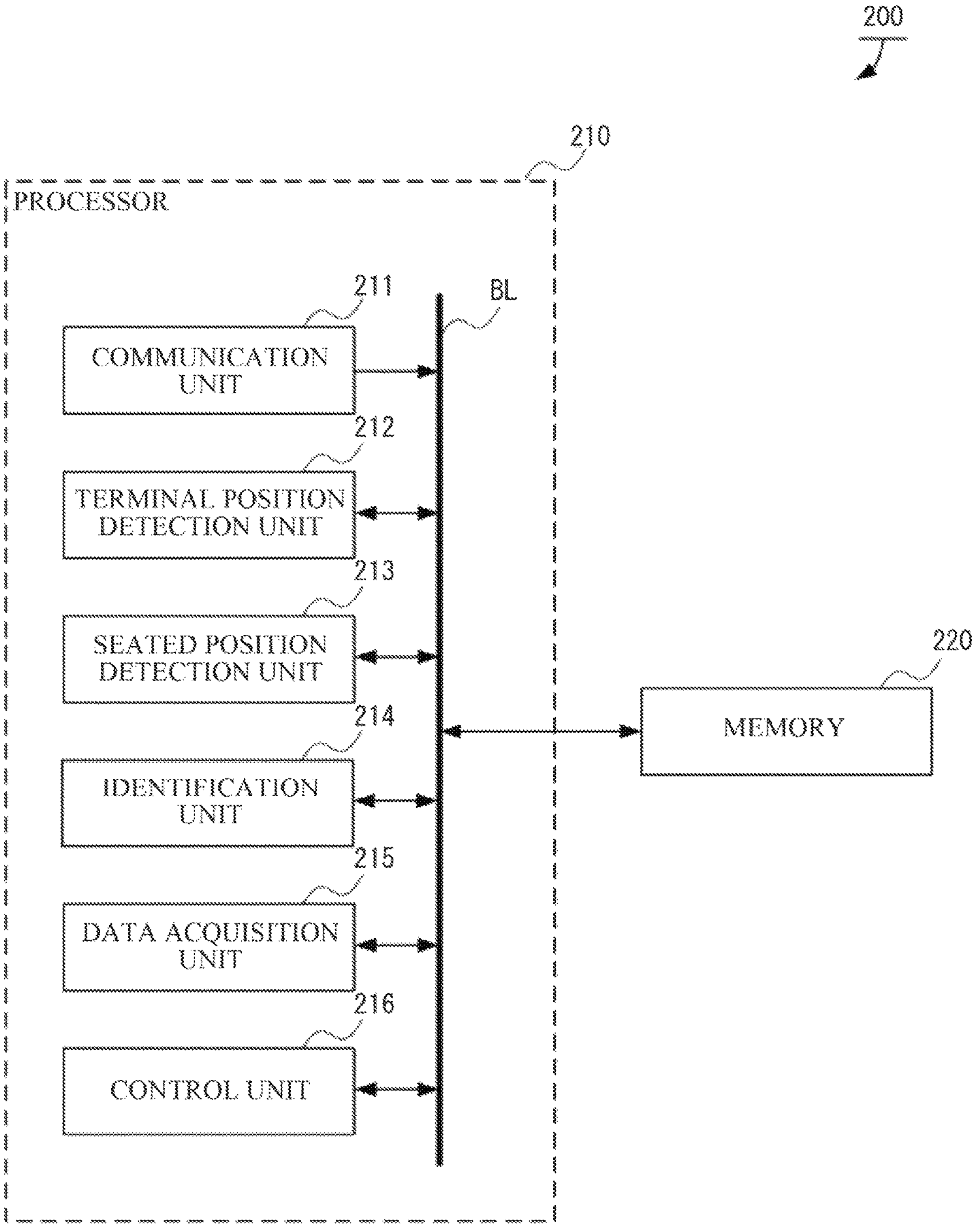
FIG. 4 is a block diagram of a configuration of a vehicle air conditioning control apparatus included in the vehicle air conditioning control system according to the embodiment of the disclosure.

As illustrated in FIG. 4, the vehicle air conditioning control apparatus 200 may include, for example, a processor 210 and a memory 220.

Details of the processor 210 are described later.

The memory 220 may include, for example, a read only memory (ROM) and a random access memory (RAM). The ROM may hold a control program. The RAM holds, for example, data received from the processor 210 described below.

<Configuration of Processor 210>

The processor 210 may include, for example, a communication unit 211, a terminal position detection unit 212, a seated position detection unit 213, an identification unit 214, a data acquisition unit 215, and a control unit 216. These units may be coupled together through a bus line BL and also coupled to the memory 220 through the bus line BL.

The communication unit 211 may be coupled to the mobile terminals 100 carried by the occupants on board the vehicle by using, for example, Bluetooth (registered trademark) communication, and serve as an interface for transmission and receipt of the preference data regarding the air conditioning settings.

The terminal position detection unit 212 may detect positions of the mobile terminals 100.

The terminal position detection unit 212 may detect the mobile terminals 100 present in the vehicle, detect the positions of the mobile terminals 100, and store a detection result in the memory 220.

Figure 5:
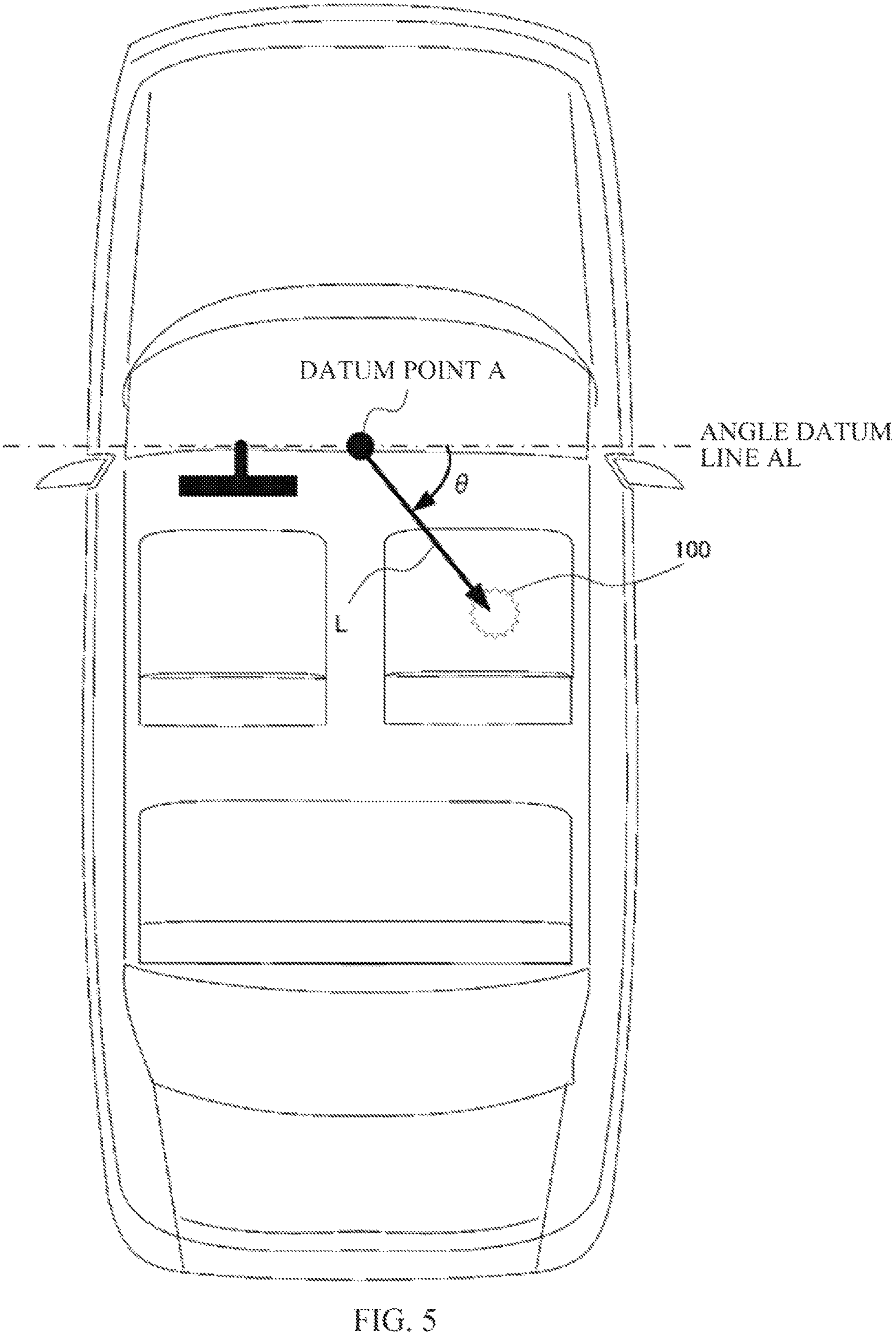
FIG. 5 illustrates positional data regarding the mobile terminal to be detected by the vehicle air conditioning control apparatus according to the embodiment of the disclosure.

As illustrated in FIG. 5, by using, for example, Bluetooth (registered trademark) communication with the mobile terminals 100, the terminal position detection unit 212 may calculate a distance L and an angle θ. The distance L is a distance from a set datum point A to each mobile terminal 100. The angle θ is an angle formed by the distance L with respect to an angle datum line AL passing through the datum point A.

Here, it suffices that the terminal position detection unit 212 detects the positions of the mobile terminals 100 present in the vehicle. Thus, the terminal position detection unit 212 may detect the positions of the mobile terminals 100 by using, for example, ultra-wide band (UWB) communication.

The seated position detection unit 213 may detect seated positions respectively occupied by the occupants.

The seated position detection unit 213 may detect which seat each of the occupants of the vehicle is seated on, based on, for example, an output of a seating sensor. The seating sensor may be disposed in each seat of the vehicle and detect a load applied to a seat surface of the seat. The seated position detection unit 213 may store a detection result in the memory 220.

It suffices that the seated position detection unit 213 detects the seated positions of the occupants. Thus, the seated position detection unit 213 may detect the seated positions of the occupants based on, for example, an image of an inside of a cabin of the vehicle.

The identification unit 214 may identify the mobile terminals 100 as being respectively associated with the seated positions, based on the positions of the mobile terminals 100 and the seated positions.

Here, description is given of an example of a method by which the identification unit 214 identifies the mobile terminals 100 as being respectively associated with the seated positions.

Figure 6:
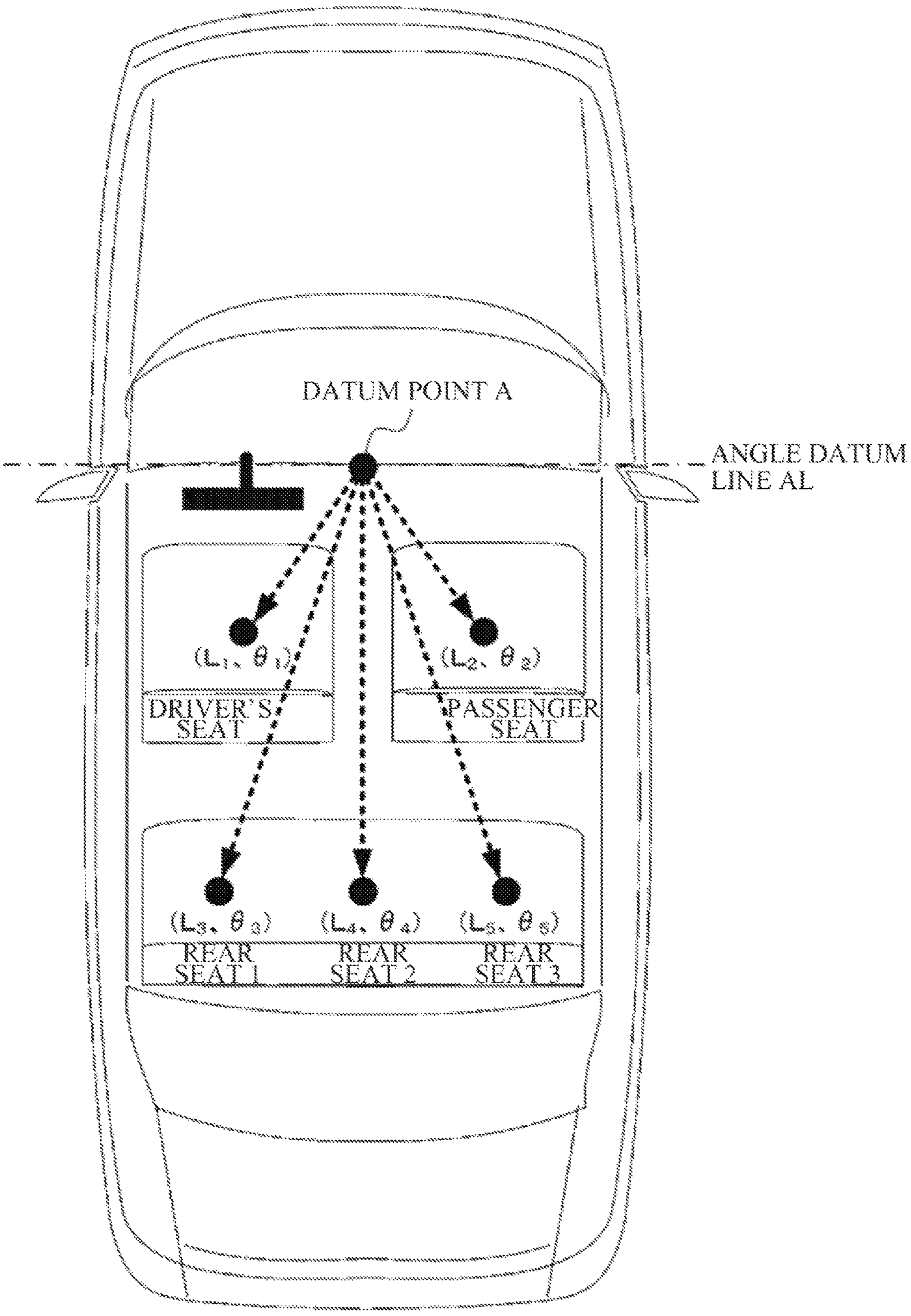
FIG. 6 illustrates positional data regarding seats to which the vehicle air conditioning control apparatus according to the embodiment of the disclosure refers in associating the mobile terminal with one of the seats.

As illustrated in FIG. 6, the seats present in the vehicle may include, for example, a driver's seat, a passenger seat, and rear seats 1 to 3. Positional data regarding the seats present in the vehicle may be indicated by the distance L and the angle θ, as with the detection of the positions of the mobile terminals 100. The distance L is the distance from the datum point A to the mobile terminal 100. The angle θ is formed by the distance L and the angle datum line AL. The angle datum line AL passes through the datum point A. The positional data regarding the seats present in the vehicle may be held in advance in the memory 220.

The identification unit 214 may acquire, from the memory 220, the positional data regarding the seat on which the seated position detection unit 213 has detected the occupant is seated. The identification unit 214 may identify the mobile terminal 100 present at the smallest distance from the relevant seated position as the mobile terminal carried by the occupant seated on the seat.

The identification unit 214 may identify the mobile terminals 100 as being respectively associated with the seats on which the seated position detection unit 213 has detected the occupants are seated. The identification unit 214 may store the identification result in the memory 220.

The data acquisition unit 215 may acquire the preference data from the mobile terminals 100.

The data acquisition unit 215 may be coupled to the mobile terminals 100 through the communication unit 211, and acquire data regarding the preference data held in the storage 120 of the mobile terminals 100.

The data acquisition unit 215 may associate the acquired preference data, the mobile terminal 100 from which the preference data has been acquired, and the seated position with one another, and store the association result in the memory 220.

The control unit 216 may make an overall control of the vehicle air conditioning control apparatus 200 in accordance with the control program held in the memory 220.

In this embodiment, the control unit 216 may control the air conditioning settings for each seated position based on the seated position and the preference data acquired from the mobile terminal 100 associated with the seated position.

The control unit 216 may determine setting values for each seat, e.g., the temperature, the air volume, and the wind direction, based on, for example, a "setting temperature", a "setting air volume", and a "wind direction" in the preference data illustrated in FIG. 3.

Moreover, for example, when the occupant is sensitive to heat, the control unit 216 may determine the air volume and the wind direction to allow the occupant to feel cool quickly, based on the "setting air volume" and the "wind direction" in the preference data. For example, the control unit 216 may determine the air volume and the wind direction to allow "the wind to blow on the occupant's face".

The control unit 216 may transmit the air conditioning setting values for each seated position to the air conditioner 300, and store the transmitted air conditioning setting values in the memory 220.

When the air conditioning settings set based on the preference data regarding respective occupants have a greater deviation than a predetermined value, the control unit 216 may change the air conditioning settings for the respective seated positions, to allow the deviation to become equal to or smaller than the predetermined value.

With reference to FIG. 7, an example of a process of changing the air conditioning settings is described.

The control unit 216 may calculate a temperature difference, i.e., the deviation, in the setting temperature in the preference data acquired from the mobile terminals 100 present in the vehicle.

When the temperature difference, i.e., the deviation, in the setting temperature is greater than, for example, 4° C., the control unit 216 may change the temperature settings for the respective seated positions to allow the temperature difference, i.e., the deviation, to become equal to or smaller than 4° C.

As illustrated in FIG. 7, when a difference between the setting temperature for the driver's seat and the setting temperature for the passenger seat is 6° C., the control unit 216 may change the setting temperature for the driver's seat and the setting temperature for the passenger seat to allow the temperature difference to become equal to or smaller than 4° C.

For example, the control unit 216 may change the setting temperature for the driver's seat and the setting temperature for the passenger seat to allow the setting temperature for the driver's seat, e.g., 26° C., and the setting temperature for the passenger seat, e.g., 20° C., to be shifted equally toward an average temperature, i.e., 23° C.

In one example, the control unit 216 may change the setting temperature for the driver's seat associated with the mobile terminal 100_1 from 26° C. to 25° C. That is, the control unit 216 may change the setting temperature for the driver's seat, to decrease the setting temperature for the driver's seat by 1° C. The control unit 216 may change the setting temperature for the passenger seat associated with the mobile terminal 100_2 from 20° C. to 21° C. That is, the control unit 216 may change the setting temperature for the passenger seat, to increase the setting temperature for the passenger seat by 1° C.

When three or more mobile terminals 100 present in the vehicle are detected, the control unit 216 may check whether or not a difference between the highest temperature and the lowest temperature of the setting temperatures in the preference data is greater than the predetermined value. When the temperature difference is greater than the predetermined value, the control unit 216 may change the setting temperatures for the respective seated positions to allow the temperature difference to become equal to or smaller than the predetermined value.

The control unit 216 may transmit the air conditioning setting values for the respective seated positions determined by the changing process described above, to the air conditioner 300, and store the transmitted air conditioning setting values in the memory 220.

Moreover, when the identification unit 214 fails in identifying a first one of the mobile terminals 100 to be associated with a first one of the seated positions, the control unit 216 may determine the air conditioning setting for the first one of the seated positions with which the identification unit 214 has failed in identifying the first one of the mobile terminals 100 as being associated, based on the preference data acquired from a second one of the mobile terminals 100 successfully identified by the identification unit 214.

As illustrated in FIG. 8, for example, when the identification unit 214 fails in identifying the mobile terminal 100 to be associated with the rear seat 1, the control unit 216 may determine the air conditioning settings for the rear seat 1 based on the preference data acquired from the mobile terminal 100_1 associated with the driver's seat and the mobile terminal 100_2 associated with the passenger seat.

In one example, the control unit 216 may determine the temperature setting for the rear seat 1 as the average value of the setting temperatures acquired from the mobile terminal 100_1 and the mobile terminal 100_2.

<Processing by Vehicle Air Conditioning Control Apparatus 200>

Figure 9:
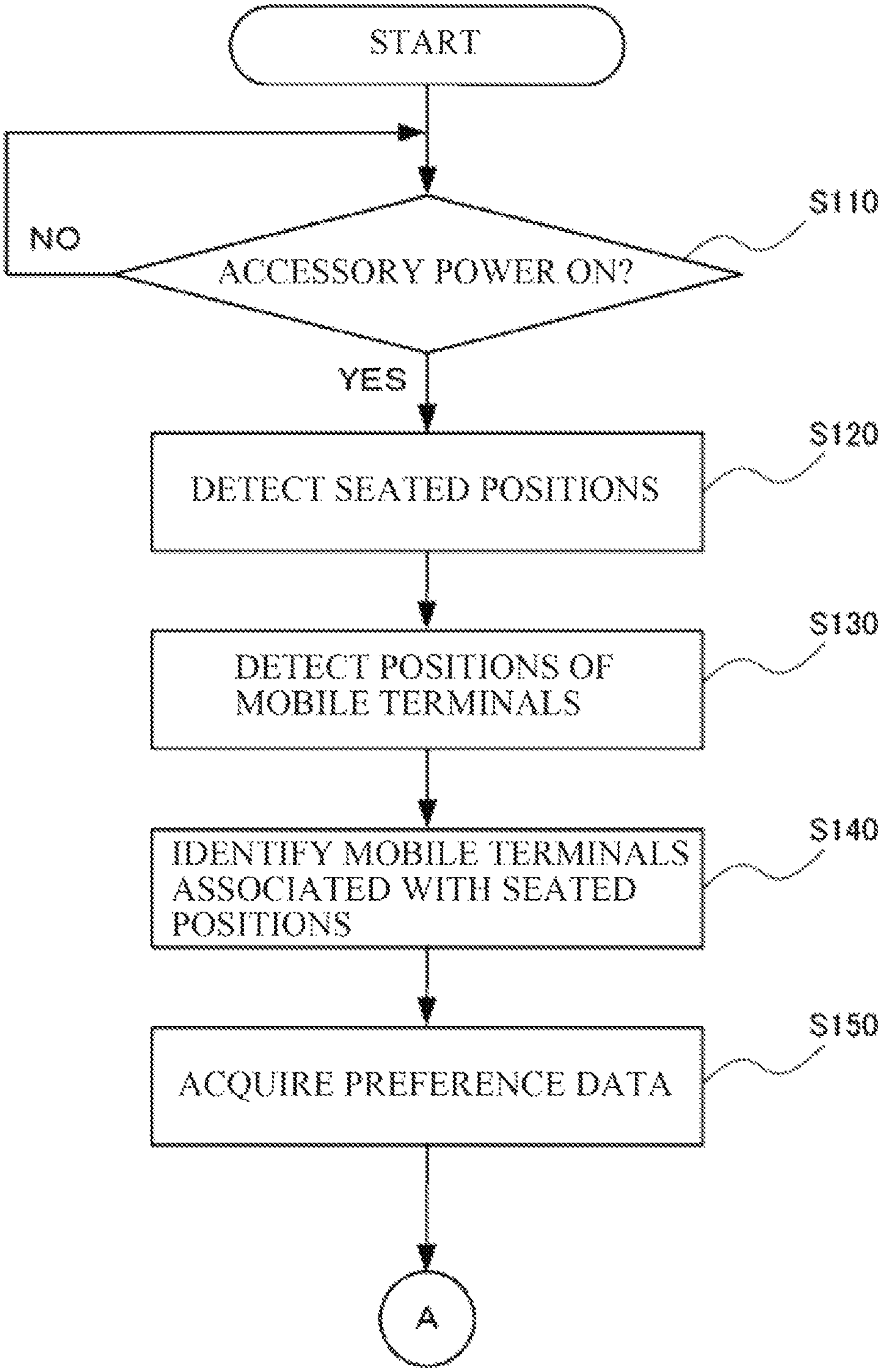
FIG. 9 is a flowchart of processing by the vehicle air conditioning control apparatus according to the embodiment of the disclosure.
Figure 10:
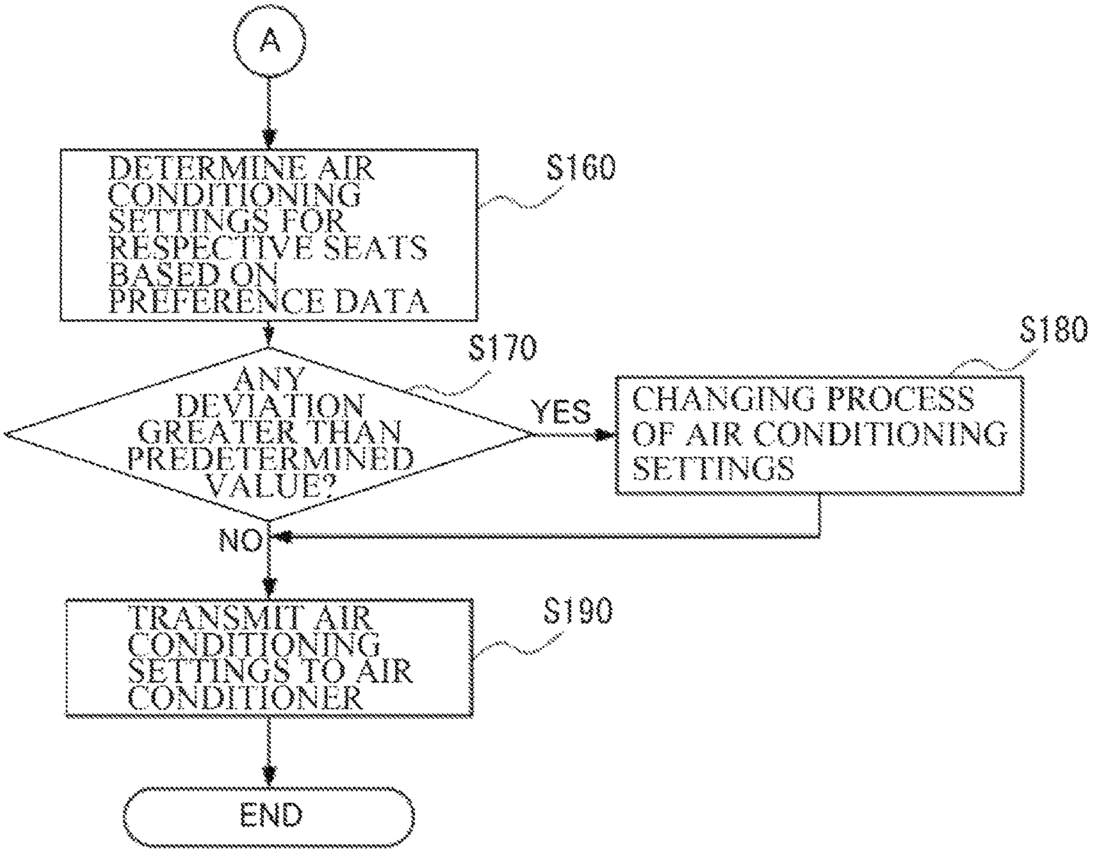
FIG. 10 is a flowchart of the processing by the vehicle air conditioning control apparatus according to the embodiment of the disclosure.

With reference to FIGS. 9 and 10, processing by the vehicle air conditioning control apparatus 200 is described.

As illustrated in FIG. 9, the control unit 216 may determine whether or not an accessory (ACC) power supply of the vehicle is turned on (step S110).

When the control unit 216 determines that the accessory (ACC) power supply of the vehicle is not turned on ("NO" in step S110), the control unit 216 may cause the flow to return and shift to a standby mode.

When the control unit 216 determines that the accessory (ACC) power supply is turned on ("YES" in step S110), the seated position detection unit 213 may detect the seated positions respectively occupied by the occupants of the vehicle, and store the detection result in the memory 220 (step S120).

The terminal position detection unit 212 may detect the positions of the mobile terminals 100 present in the vehicle, and store the detection result in the memory 220 (step S130).

The identification unit 214 may identify the mobile terminals 100 as being respectively associated with the seated positions based on the seated positions of the occupants detected in step S120 and the positions of the mobile terminals 100 detected in step S130 (step S140). The identification unit 214 may store the identification result in the memory 220.

The data acquisition unit 215 may acquire the preference data from the mobile terminals 100 present in the vehicle, store the preference data in the memory 220 (step S150), and cause the flow to proceed to step S160.

The control unit 216 may determine the air conditioning settings for the respective seats associated with the mobile terminals 100 based on the preference data acquired in step S150 (step S160), and cause the flow to proceed to step S170.

The control unit 216 may determine whether or not the determined air conditioning settings for the respective seats have the deviation greater than the predetermined value (step S170).

When the control unit 216 determines that the determined air conditioning settings for the respective seats does not have the deviation greater than the predetermined value ("NO" in step S170), the control unit 216 may cause the flow to proceed to step S190.

When the control unit 216 determines that the determined air conditioning settings for the respective seats have the deviation greater than the predetermined value ("YES" in step S170), the control unit 216 may carry out the process of changing the air conditioning setting values (step S180), and cause the flow to proceed to step S190.

The control unit 216 may transmit the determined air conditioning settings for the respective seats to the air conditioner 300 (step S190), and end the processing.

<Workings and Effects>

As described, the vehicle air conditioning control system 1 according to this embodiment includes the mobile terminals 100 and the vehicle air conditioning control apparatus 200. The mobile terminals 100 are carried by the occupants of the vehicle. The vehicle air conditioning control apparatus 200 is configured to communicate with the mobile terminals 100. The mobile terminals 100 each include the preference data acquisition unit 110. The preference data acquisition unit 110 is configured to acquire the preference data regarding the air conditioning settings for the corresponding one of the occupants, and allow the storage 120 to hold the preference data. The vehicle air conditioning control apparatus 200 includes the terminal position detection unit 212, the seated position detection unit 213, the identification unit 214, the data acquisition unit 215, and the control unit 216. The terminal position detection unit 212 is configured to detect the positions of the mobile terminals 100. The seated position detection unit 213 is configured to detect the seated positions respectively occupied by the occupants. The identification unit 214 is configured to identify the mobile terminals 100 as being respectively associated with the seated positions based on the positions of the mobile terminals 100 and the seated positions. The data acquisition unit 215 is configured to acquire the preference data from the mobile terminals 100. The control unit 216 is configured to control the air conditioning settings for the respective seated positions, based on the seated positions and the preference data acquired from the mobile terminals 100 respectively associated with the seated positions.

That is, when the occupants get on the vehicle, e.g., when the accessory power supply is turned on, the vehicle air conditioning control apparatus 200 is configured to acquire the preference data regarding the air conditioning settings for the respective occupants from the mobile terminals 100 carried by the respective occupants. The vehicle air conditioning control apparatus 200 is configured to associate the positions of the mobile terminals 100 with the seated positions respectively occupied by the occupants, and make an air conditioning control of each seat based on the acquired preference data.

Thus, it is possible for the vehicle air conditioning control system 1 to make the air conditioning control that reflects the preference of each occupant without limitation as to vehicles.

Moreover, the vehicle air conditioning control apparatus 200 does not acquire the preference data regarding the occupants registered in a server coupled to the Internet network, but is configured to acquire the preference data regarding the occupants from the mobile terminals 100 carried by the occupants.

This makes it possible for the vehicle air conditioning control apparatus 200 to acquire the preference data regarding the occupants from the mobile terminals 100 carried by the occupants, even when, for example, the current position of the vehicle is in an area where the coupling to the Internet network is unavailable. Hence, it is possible to make the air conditioning control that reflects the preference of each occupant without limitation as to the current position of the vehicle.

Moreover, in this embodiment, when the air conditioning settings set based on the preference data regarding the respective occupants have the deviation greater than the predetermined value, the control unit 216 of the vehicle air conditioning control apparatus 200 may change the air conditioning settings for the respective seated positions, to allow the deviation to become equal to or smaller than the predetermined value.

For example, when the temperature setting for the occupant seated on the driver's seat and the temperature setting for the occupant seated on the passenger seat have the temperature difference, i.e., the deviation, greater than the predetermined value, the winds having the temperature difference interfere with each other, causing both occupants to feel uncomfortable.

Thus, the control unit 216 may change the temperature setting values for the respective seats, to allow the temperature difference to become equal to or smaller than the predetermined value. This makes it possible to make both occupants feel less uncomfortable despite the temperature difference.

Hence, it is possible for the vehicle air conditioning control system 1 to make the air conditioning control in consideration of the preference data regarding the occupants.

Furthermore, as the deviation between the temperature setting values for the respective seats becomes greater, energy to be consumed by, for example, the blower fan, the heater, and the compressor of the air conditioner 300 increases. Thus, for example, in the case of an electric vehicle, a cruising distance becomes short, and in the case of a vehicle equipped with an engine, fuel efficiency declines.

In contrast, in this embodiment, when the deviation between the temperature settings for the respective seats is greater than the predetermined value, the control unit 216 may change the temperature setting value for each seat, to allow the deviation between the temperature setting values for the respective seats to become equal to or smaller than the predetermined value. Hence, it is possible to suppress reduction in the cruising distance and a decline in the fuel efficiency.

In addition, in this embodiment, when the identification unit 214 fails in identifying the first one of the mobile terminals 100 to be associated with the first one of the seated positions, the control unit 216 of the vehicle air conditioning control apparatus 200 may determine the air conditioning setting for the first one of the seated positions with which the identification unit 214 has failed in identifying the first one of the mobile terminals 100 as being associated, based on the preference data acquired from the second one of the mobile terminals 100 successfully identified by the identification unit 214.

That is, when an infant, etc. who does not carry the mobile terminal 100 is seated, no mobile terminal 100 to be associated with the seated position is detected. Thus, the control unit 216 may determine the air conditioning setting for the seat on which the infant, etc. is seated, based on the preference data acquired from another of the mobile terminals 100 present in the vehicle.

Hence, it is possible for the vehicle air conditioning control system 1 to apply the air conditioning settings determined based on the preference data regarding other occupants even when an occupant who does not carry the mobile terminal 100 is on board the vehicle.

Moreover, the control unit 216 may set the air conditioning setting for the seated position with which the identification unit 214 has failed in identifying the mobile terminal 100 as being associated, to the average value to be obtained from the preference data acquired from the mobile terminals 100 successfully identified by the identification unit 214.

This suppresses an increase in the deviation between the temperature settings for the respective seats. Hence, it is possible for the vehicle air conditioning control system 1 to suppress the reduction in the cruising distance and the decline in the fuel efficiency.

Second Embodiment

With reference to FIGS. 11 to 14, a vehicle air conditioning control system 1A according to a second embodiment is described.

Constituent elements denoted by the same reference characters as those of the first embodiment have similar configurations, and detailed description thereof is omitted.

<Configuration of Vehicle Air Conditioning Control System 1A>

Figure 11:
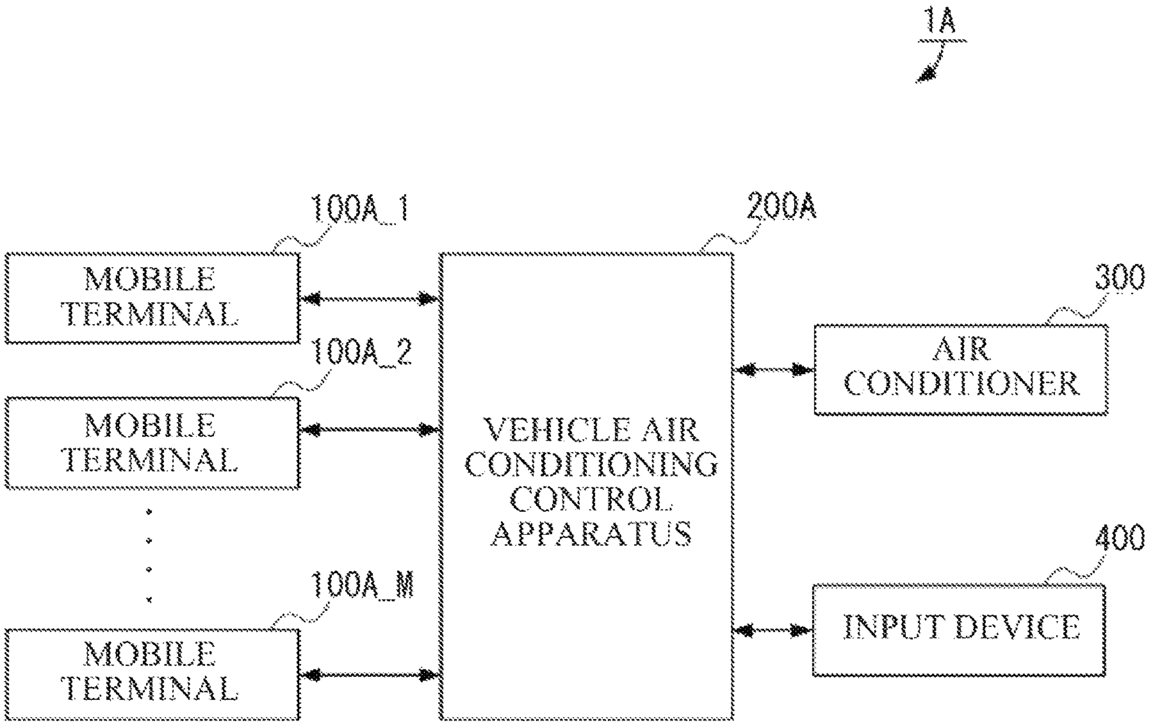
FIG. 11 is a block diagram of a configuration of a vehicle air conditioning control system according to an embodiment of the disclosure.

As illustrated in FIG. 11, the vehicle air conditioning control system 1 of this embodiment may include, for example, mobile terminals 100A_1 to 100A_M and a vehicle air conditioning control apparatus 200A.

In the following, the mobile terminals 100A_1 to 100A_M are generally referred to as the "mobile terminals 100A".

<Configuration of Mobile Terminals 100A>

Figure 12:
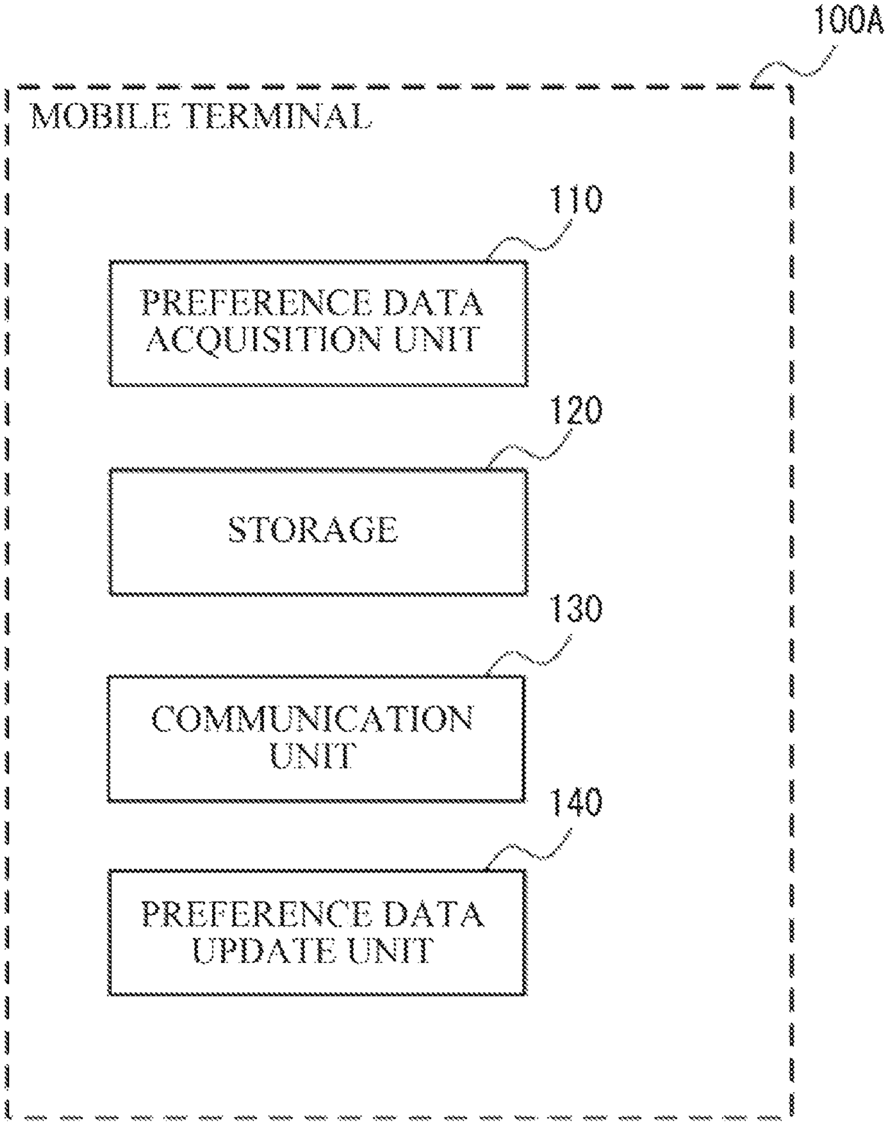
FIG. 12 is a block diagram of a configuration of a mobile terminal included in the vehicle air conditioning control system according to the embodiment of the disclosure.

As illustrated in FIG. 12, the mobile terminals 100A may each include the preference data acquisition unit 110, the storage 120, the communication unit 130, and a preference data update unit 140.

When receiving update preference data from the vehicle air conditioning control apparatus 200A described later through the communication unit 130, the preference data update unit 140 may update the preference data regarding the occupant held in the storage 120, with the update preference data received.

<Configuration of Vehicle Air Conditioning Control Apparatus 200A>

Figure 13:
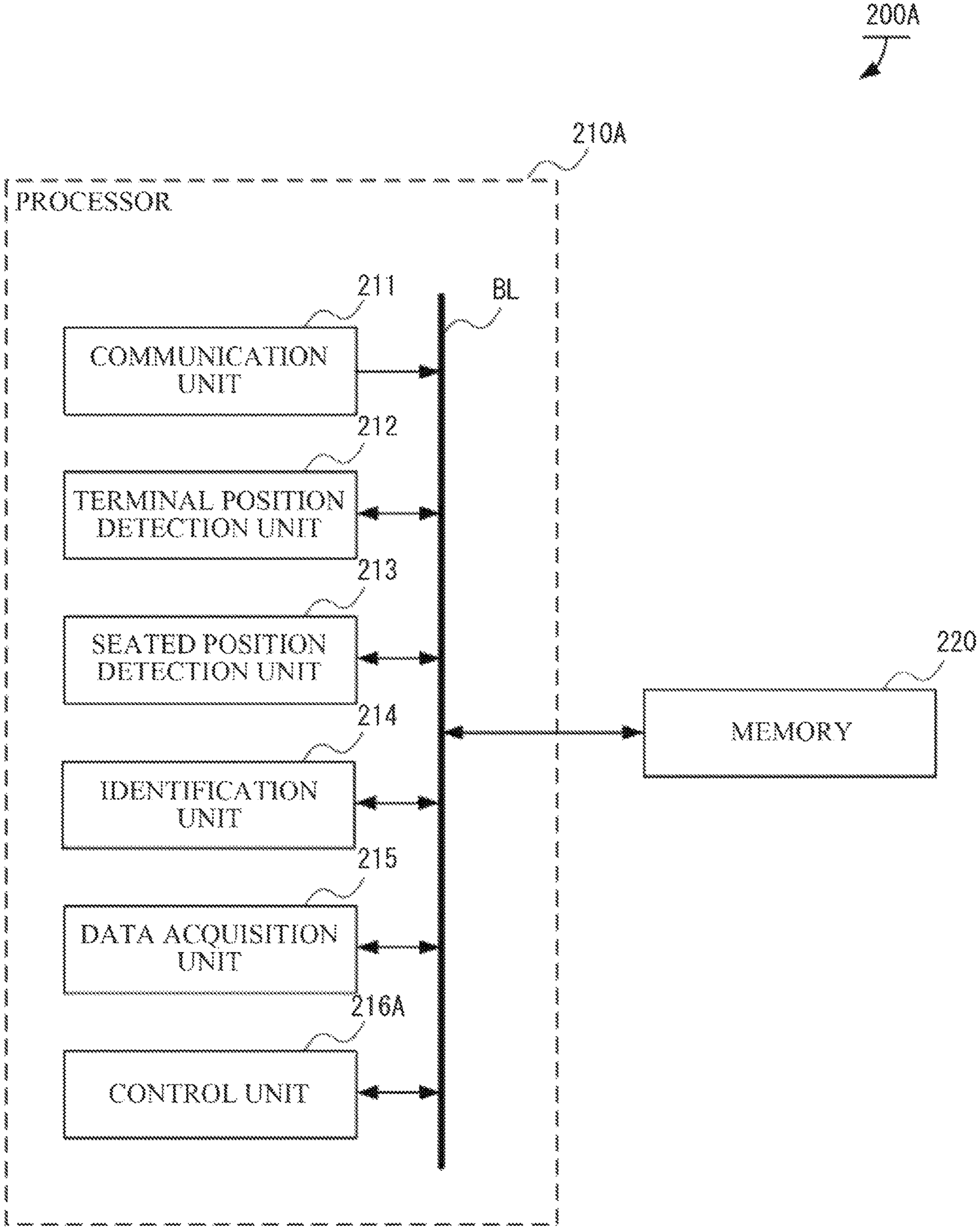
FIG. 13 is a block diagram of a configuration of a vehicle air conditioning control apparatus included in the vehicle air conditioning control system according to the embodiment of the disclosure.

As illustrated in FIG. 13, the vehicle air conditioning control apparatus 200A may include a processor 210A and the memory 220.

<Configuration of Processor 210A>

The processor 210A may include the communication unit 211, the terminal position detection unit 212, the seated position detection unit 213, the identification unit 214, the data acquisition unit 215, and a control unit 216A.

When the set air conditioning setting for any one of the seated positions is changed based on a changeover operation by the occupant, and the relevant air conditioning setting remains unchanged for a predetermined period of time or longer, the control unit 216A may transmit the update preference data updated based on the relevant air conditioning setting, to one of the mobile terminals 100A associated with the relevant one of the seated positions, to update the preference data held in relevant one of the mobile terminals 100A, with the update preference data.

When the control unit 216A receives data regarding the changeover operation to change the air conditioning setting for any one of the seated positions from the input device 400, and thereafter, the relevant air conditioning setting remains unchanged for the predetermined period of time or longer, e.g., 15 minutes or longer, the control unit 216A may determine that the changed air conditioning setting matches the occupant's preference of the air conditioning setting. Thus, the control unit 216A may transmit the update preference data based on the changed air conditioning setting, to one of the mobile terminals 100A associated with the relevant one of the seated positions, to update the preference data held in the relevant one of the mobile terminals 100A, with the update preference data.

In one example, when sensing that, for example, the setting temperature has been changed, the control unit 216A may update the setting temperature in the preference data acquired from the mobile terminal 100A, with the update preference data updated with the changed setting temperature.

In another example, let us assume a case where the control unit 216A makes the air conditioning control, based on the preference data, with a setting of the wind direction that prevents the wind from blowing on the occupant's face, but the control unit 216A senses that the setting of the wind direction has been changed to allow the wind to blow on the occupant's face. In this case, the control unit 216A may update the item of the wind direction in the preference data, with the update preference data thus updated.

The control unit 216A may transmit the update preference data to the mobile terminal 100A associated with the seat for which the air conditioning setting has been changed.

<Processing by Vehicle Air Conditioning Control System 1A>

Figure 14:
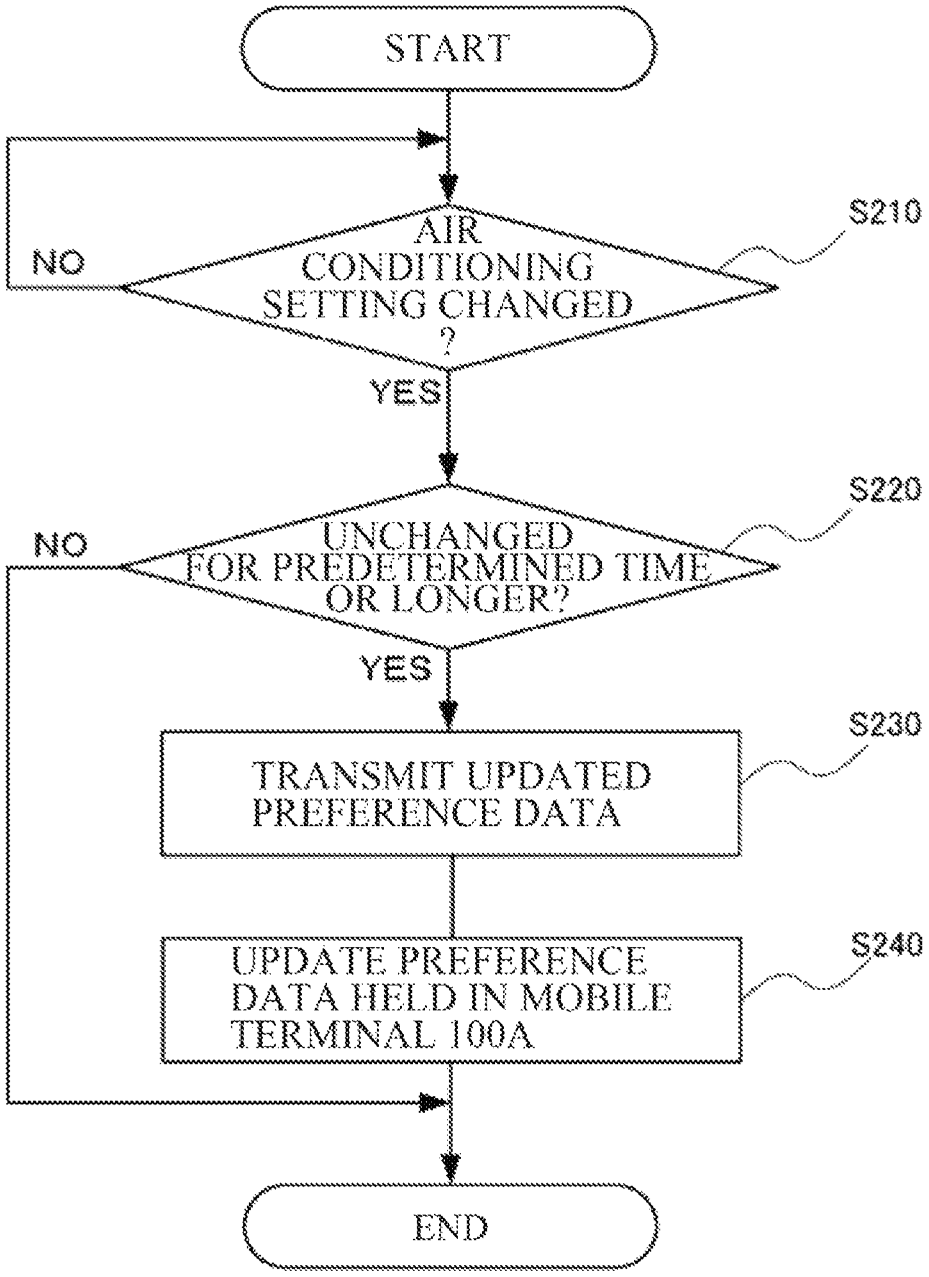
FIG. 14 is a flowchart of processing by the vehicle air conditioning control apparatus according to the embodiment of the disclosure.

With reference to FIG. 14, description is given of processing by the vehicle air conditioning control system 1A when the air conditioning setting set based on the preference data is changed by the occupant.

The control unit 216A of the vehicle air conditioning control apparatus 200A may check whether or not the air conditioning setting for any one of the seated positions has been changed based on the changeover operation by the occupant (step S210).

When determining, based on the data received from the input device 400, that the air conditioning setting has not been changed based on the changeover operation by the occupant ("NO" in step S210), the control unit 216A may cause the flow to return and shift to a standby state.

When determining, based on the data received from the input device 400, that the air conditioning setting has been changed based on the changeover operation by the occupant ("YES" in step S210), the control unit 216A may cause the flow to proceed to step S220.

The control unit 216A may determine whether or not the air conditioning setting changed based on the changeover operation by the occupant has remained unchanged for the predetermined period of time or longer (step S220).

When the control unit 216A determines that the air conditioning setting changed based on the changeover operation by the occupant has been changed before an elapse of the predetermined period of time ("NO" in step S220), the control unit 216A may end the processing.

When the control unit 216A determines that the air conditioning setting changed based on the changeover operation by the occupant has remained unchanged for the predetermined period of time or longer ("YES" in step S220), the control unit 216A may transmit the update preference data based on the changed air conditioning setting, to one of the mobile terminals 100A associated with the relevant one of the seated positions (step S230).

The preference data update unit 140 of the relevant one of the mobile terminals 100A may update the preference data held in the storage 120, with the update preference data received (step S240), and end the processing.

<Workings and Effects>

As described, in the vehicle air conditioning control system 1A according to this embodiment, when the set air conditioning setting for any one of the seated positions is changed based on the changeover operation, and the relevant air conditioning setting remains unchanged for the predetermined period of time or longer, the control unit 216A is configured to transmit the update preference data updated based on the relevant air conditioning setting, to one of the mobile terminals 100A associated with the relevant one of the seated positions, to update the preference data held in the relevant one of the mobile terminals 100A, with the update preference data.

That is, when the control unit 216A makes the air conditioning control by the air conditioning setting based on the preference data regarding the occupant, but the occupant changes the air conditioning setting, the control unit 216A may determine that there is high possibility that the air conditioning setting does not match the preference of the occupant.

After the occupant changes the air conditioning setting, when the air conditioning setting remains unchanged for the predetermined period of time or longer, the control unit 216A may determine that the changed air conditioning setting matches the preference of the occupant. Thus, the control unit 216A may transmit the update preference data updated based on the changed air conditioning setting, to one of the mobile terminals 100A associated with the seated position for which the air conditioning setting has been changed, to update the preference data held in the relevant one of the mobile terminals 100A, with the update preference data.

Thus, the preference data held in the mobile terminal 100A is updated with the preference data that reflects the preference of the occupant, even when the occupant's preference of the air conditioning setting changes with, for example, a seasonal change. Hence, it is possible for the vehicle air conditioning control system 1A to make the air conditioning control that reflects the occupant's preference.

Moreover, the vehicle air conditioning control system 1A is configured to update the preference data held in the storage 120 of the mobile terminal 100A, with the update preference data. Hence, it is possible to make the air conditioning control that reflects the preference of each occupant without limitation as to vehicles.

Modification Example 1

In the forgoing example embodiments, when no preference data is registered in one of the mobile terminals 100 associated with one of the seated positions, the control unit 216 of the vehicle air conditioning control apparatus 200 may determine the air conditioning setting for the seated position associated with the mobile terminal in which no preference data is registered, based on the preference data acquired from another of the mobile terminals 100.

Thus, in the vehicle air conditioning control system 1, it is possible to apply the air conditioning setting determined based on the preference data regarding another occupant even when no preference data is registered in one of the mobile terminals 100.

Moreover, the control unit 216 may transmit an instruction to the mobile terminal 100 in which no preference data is registered, to provide display to prompt the occupant to input the preference data.

In one example, when receiving, from the control unit 216, the instruction to provide the display to prompt the occupant to input the preference data, the mobile terminal 100 may provide, on an unillustrated display unit of the mobile terminal 100, display saying, for example, "Please register the preference data regarding your air conditioning settings. If you register the preference data, we can provide comfortable vehicle space in which your favorite air conditioning settings are reflected, without limitation as to vehicles".

This makes it possible to prompt the occupant to register the preference data in the mobile terminal 100. When the occupant registers the preference data in the mobile terminal 100, it is possible for the vehicle air conditioning control system 1 to make the air conditioning control in which the occupant's preference is reflected, without limitation as to vehicles.

In some embodiments, it is possible to implement the vehicle air conditioning control apparatus 200 of the example embodiments of the disclosure by recording the processing to be carried out by the communication unit 211, the terminal position detection unit 212, the seated position detection unit 213, the identification unit 214, the data acquisition unit 215, and the control unit 216, etc. on a non-transitory recording medium readable by a computer system, and causing the computer system to load the program recorded on the non-transitory recording medium onto the memory to execute the program.

The computer system as used herein may encompass an operating system (OS) and hardware such as a peripheral device.

In addition, when the computer system utilizes a WWW (World Wide Web) system, the "computer system" may encompass a website providing environment (or a website displaying environment).

The program may be transmitted from a computer system that contains the program in a storage device or the like to another computer system via a transmission medium or by a carrier wave in a transmission medium.

The "transmission medium" that transmits the program may refer to a medium configured to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The preference data acquisition unit 110 and the preference data update unit 140 of the mobile terminals 100 and 100A, and the processors 210 and 210A of the vehicle air conditioning control apparatuses 200 and 200A illustrated in FIGS. 2, 4, 12 and 13 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the preference data acquisition unit 110 and the preference data update unit 140 of the mobile terminals 100 and 100A, and the processors 210 and 210A of the vehicle air conditioning control apparatuses 200 and 200A. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the preference data acquisition unit 110 and the preference data update unit 140 of the mobile terminals 100 and 100A, and the processors 210 and 210A of the vehicle air conditioning control apparatuses 200 and 200A illustrated in FIGS. 2, 4, 12 and 13.

The invention claimed is:

1. A vehicle air conditioning control system comprising:

one or more mobile terminals respectively carried by one or more occupants of a vehicle, each of the one or more mobile terminals being configured to directly communicate with a vehicle air conditioning control apparatus and comprising:

a storage; and one or more first processors configured to acquire preference data regarding an air conditioning setting for a corresponding one of the one or more occupants and store the preference data in the storage; and the vehicle air conditioning control apparatus being configured to directly communicate with the one or more mobile terminals and comprising:

one or more second processors; and one or more memories communicably coupled to the one or more second processors, the one or more second processors being configured to:

by using wireless communication with each of the one or more mobile terminals present in the vehicle, detect positions of the one or more mobile terminals present in the vehicle;

detect one or more seated positions respectively occupied by the one or more occupants;

identify the one or more mobile terminals present in the vehicle as being respectively associated with the one or more seated positions, based on the positions of the one or more mobile terminals present in the vehicle and the one or more seated positions;

directly acquire, from each of the one or more mobile terminals respectively associated with the one or more seated positions, the preference data stored in the storage of that mobile terminal;

control the air conditioning setting for each of the one or more seated positions, based on the one or more seated positions and the preference data directly acquired from the one or more mobile terminals respectively associated with the one or more seated positions; and when the one or more mobile terminals include multiple mobile terminals respectively carried by multiple occupants of the vehicle, and a difference between a highest setting temperature and a lowest setting temperature among setting temperatures included in air conditioning settings respectively set based on the preference data regarding the multiple occupants is greater than a predetermined value, change the air conditioning settings for seated positions respectively occupied by the multiple occupants, to allow the difference to become equal to or smaller than the predetermined value.

2. The vehicle air conditioning control system according to claim 1, wherein the one or more mobile terminals comprise two or more mobile terminals, and when the one or more second processors fail to identify a first one of the two or more mobile terminals as being associated with a first one of the one or more seated positions, the is one or more second processors are configured to determine the air conditioning setting for the first one of the one or more seated positions based on the preference data directly acquired from a second one of the two or more mobile terminals identified by the one or more second processors.

3. The vehicle air conditioning control system according to claim 1, wherein when an air conditioning setting for a seated position of the one or more seated positions is changed based on a changeover operation, and the changed air conditioning setting remains unchanged for a predetermined period of time, the is one or more second processors are configured to transmit update preference data, which is updated based on the changed air conditioning setting, to one of the one or more mobile terminals associated with the seated position for which the air conditioning setting has been changed, to update the preference data held in the storage of that mobile terminal with the update preference data.

4. A vehicle air conditioning control system comprising:

one or more mobile terminals respectively carried by one or more occupants of a vehicle, each of the one or more mobile terminals comprising:

a storage; and first circuitry configured to acquire preference data regarding an air conditioning setting for a corresponding one of the one or more occupants and store the preference data in the storage; and directly communicate with a vehicle air conditioning control apparatus; and the vehicle air conditioning control apparatus comprising second circuitry configured to:

directly communicate with the one or more mobile terminals, by using wireless communication with each of the one or more mobile terminals present in the vehicle, detect positions of the one or more mobile terminals present in the vehicle;

detect one or more seated positions respectively occupied by the one or more occupants;

identify the one or more mobile terminals present in the vehicle as being respectively associated with the one or more seated positions, based on the positions of the one or more mobile terminals present in the vehicle and the one or more seated positions;

directly acquire, from each of the one or more mobile terminals respectively associated with the one or more seated positions, the preference data stored in the storage of that mobile terminal; and control the air conditioning setting for each of the one or more seated positions, based on the one or more seated positions and the preference data directly acquired from the one or more mobile terminals respectively associated with the one or more seated positions when the one or more mobile terminals include multiple mobile terminals respectively carried by multiple occupants of the vehicle, and a difference between a highest setting temperature and a lowest setting temperature among setting temperatures included in air conditioning settings respectively set based on the preference data regarding the multiple occupants is greater than a predetermined value, change the air conditioning settings for seated positions respectively occupied by the multiple occupants, to allow the difference to become equal to or smaller than the predetermined value.

5. A vehicle air conditioning control system comprising:

a first mobile terminal carried by a first occupant of a vehicle, and a second mobile terminal carried by a second occupant of the vehicle, each of the first mobile terminal and the second mobile terminal being configured to directly communicate with a vehicle air conditioning control apparatus and comprising:

a storage; and one or more first processors configured to acquire preference data regarding an air conditioning setting for the occupant carrying that mobile terminal and store the preference data in the storage; and the vehicle air conditioning control apparatus being configured to directly communicate with the first mobile terminal and the second mobile terminal and comprising:

one or more second processors; and one or more memories communicably coupled to the one or more second processors, the one or more second processors being configured to:

by using wireless communication with the first mobile terminal and the second mobile terminal present in the vehicle, detect positions of the first mobile terminal and the second mobile terminal present in the vehicle;

detect a first seated position and a second seated position occupied in the vehicle;

identify the first mobile terminal and the second mobile terminal present in the vehicle as being respectively associated with the first seated position and the second seated position, based on the positions of the first mobile terminal and the second mobile terminal present in the vehicle and the first seated position and the second seated position;

directly acquire, from each of the first mobile terminal and the second mobile terminal respectively associated with the first seated position and the second seated position, the preference data stored in the storage of that mobile terminal; and control an air conditioning setting for each of the first seated position and the second seated position, based on the preference data directly acquired from the first mobile terminal and the second mobile terminal respectively associated with the first seated position and the second seated position; and when a difference between a first setting temperature included in an air conditioning setting for the first seated position and a second setting temperature included in an air conditioning setting for the second seated position is greater than a predetermined value, change the air conditioning settings for the first seated position and the second seated position to allow the difference to become equal to or smaller than the predetermined value.

* * * * *